US011665770B2

(12) United States Patent
Rico Alvarino et al.

(10) Patent No.: US 11,665,770 B2
(45) Date of Patent: May 30, 2023

(54) NARROWBAND REFERENCE SIGNAL FOR USER EQUIPMENT SPECIFIC DISCONTINUOUS RECEPTION CYCLE

(71) Applicant: QUALCOMM Incorporated, San Diego, CA (US)

(72) Inventors: Alberto Rico Alvarino, San Diego, CA (US); Le Liu, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 156 days.

(21) Appl. No.: 17/060,947

(22) Filed: Oct. 1, 2020

(65) Prior Publication Data

US 2021/0105856 A1  Apr. 8, 2021

Related U.S. Application Data

(60) Provisional application No. 62/910,953, filed on Oct. 4, 2019.

(51) Int. Cl.
*H04W 4/00* (2018.01)
*H04W 76/28* (2018.01)
(Continued)

(52) U.S. Cl.
CPC .......... *H04W 76/28* (2018.02); *H04L 5/0051* (2013.01); *H04W 4/80* (2018.02); *H04W 24/08* (2013.01); *H04W 68/005* (2013.01)

(58) Field of Classification Search
None
See application file for complete search history.

(56) References Cited

U.S. PATENT DOCUMENTS 11,323,980 B2    5/2022  Rico Alvarino et al.
2012/0300685 A1* 11/2012  Kim ..................... H04W 76/28
                                                     370/311
(Continued)

FOREIGN PATENT DOCUMENTS

WO  2016022651 A1  2/2016
WO  2016022748 A1  2/2016
WO  2018175760 A1  9/2018

OTHER PUBLICATIONS

Huawei., et al., "NRS Presence on Non-Anchor Carriers for Paging", 3GPP Draft, R1-1812138, 3GPP TSG RAN WG1 Meeting #95, 3rd Generation Partnership Project (3GPP), Mobile Competence Centre, 650. Route Des Lucioles, F-06921 Sophia-Antipolis Cedex, France, vol. RAN WG1. no. Spokane, USA, Nov.12, 2018-Nov. 16, 2018, Nov. 3, 2018 (Nov. 3, 2018), XP051478263, 4 Pages, Retrieved from the Internet: URL:http://www.3gpp.org/ftp/tsg%5Fran/WG1%5FRL1/TSGR1%5F95/Docs/R1%2D1812138%2Ezip [retrieved on Nov. 3, 2018] the Whole Document.
(Continued)

*Primary Examiner* — Bob A Phunkulh
(74) *Attorney, Agent, or Firm* — Harrity & Harrity, LLP

(57) ABSTRACT

Various aspects of the present disclosure generally relate to wireless communication. In some aspects, a user equipment may identify a set of time instances to monitor for paging, wherein the set of time instances are identified based at least in part on a first discontinuous reception (DRX) cycle parameter set, identify a subset of time instances, of the set of time instances, for which a narrowband reference signal is to be monitored irrespective of whether paging is present on the subset of time instances, wherein the subset of time instances is identified based at least on a second DRX cycle
(Continued)

parameter set; and communicate based at least on the set of time instances and the subset of time instances. Numerous other aspects are provided.

56 Claims, 7 Drawing Sheets

(51) Int. Cl.
*H04W 4/80* (2018.01)
*H04W 24/08* (2009.01)
*H04W 68/00* (2009.01)
*H04L 5/00* (2006.01)

(56) References Cited

U.S. PATENT DOCUMENTS

| | | | | |
|---|---|---|---|---|
| 2015/0282080 | A1* | 10/2015 | Maattanen | H04W 76/28 370/311 |
| 2016/0044605 | A1* | 2/2016 | Vajapeyam | H04W 52/322 370/311 |
| 2016/0044632 | A1* | 2/2016 | Liang | H04W 68/02 455/426.1 |
| 2016/0057701 | A1* | 2/2016 | Choi | H04W 52/0216 370/311 |
| 2016/0099985 | A1* | 4/2016 | Koskinen | H04W 4/06 370/260 |
| 2019/0116628 | A1* | 4/2019 | Xu | H04W 72/14 |
| 2019/0215863 | A1* | 7/2019 | Kim | H04W 36/0027 |
| 2020/0022106 | A1* | 1/2020 | Kim | H04L 1/1812 |
| 2020/0053695 | A1* | 2/2020 | Charbit | H04W 8/18 |
| 2020/0245395 | A1* | 7/2020 | Zhang | H04L 5/0053 |
| 2020/0404617 | A1* | 12/2020 | Murray | H04B 7/0695 |
| 2021/0014928 | A1* | 1/2021 | Zheng | H04W 76/27 |
| 2021/0219329 | A1* | 7/2021 | Zhou | H04W 72/1257 |
| 2021/0259044 | A1* | 8/2021 | Islam | H04W 52/0235 |
| 2021/0266840 | A1* | 8/2021 | Xu | H04W 60/04 |
| 2021/0314117 | A1* | 10/2021 | Wang | H04W 52/0229 |
| 2021/0352581 | A1* | 11/2021 | Wong | H04W 52/0212 |
| 2021/0367725 | A1* | 11/2021 | Thangarasa | H04W 48/16 |
| 2021/0368444 | A1* | 11/2021 | Wang | H04W 52/0232 |
| 2021/0385034 | A1* | 12/2021 | Hwang | H04L 5/0064 |
| 2023/0007587 | A1* | 1/2023 | Ly | H04W 72/23 |

OTHER PUBLICATIONS

Huawei., et al., "NRS Presence on Non-Anchor Carriers for Paging", 3GPP Draft, R1-1903914, 10 Pages. 3GPP TSG RAN WG1 Meeting #96bis, 3rd Generation Partnership Project (3GPP), Mobile Competence Centre, 650, Route Des Lucioles, F-06921 Sophia-Antipolis Cedex, France, vol. RAN WG1, no. Xi'an, China, Apr. 8, 2019-Apr. 12, 2019, Apr. 7, 2019 (Apr. 7, 2019), XP051699347, Retrieved from the Internet: URL:http://www.3gpp.org/ftp/Meetings%5F3GPP%5FSYNC/RAN1/Docs/R1%2D1903914%2Ezip [retrieved on Apr. 7, 2019] the Whole Document.
International Search Report and Written Opinion—PCT/US2020/070610—ISA/EPO—dated Jan. 11, 2021.
Rohde & Schwarz: "Narrowband Internet of Things", Aug. 8, 2016 (Aug. 8, 2016), pp. 1-42, XP055503355, Retrieved from the Internet: URL:https://cdn.rohde-schwarz.com/pw/dl_downloads/dl_application/application_notes/1ma266/1MA266_0e_NB_IoT.pdf [retrieved on—Aug. 30, 2018] Paragraph [3.2.2]—Paragraph [3.3.2].

* cited by examiner

NARROWBAND REFERENCE SIGNAL FOR USER EQUIPMENT SPECIFIC DISCONTINUOUS RECEPTION CYCLE

CROSS-REFERENCE TO RELATED APPLICATION

This Patent Application claims priority to U.S. Provisional Patent Application No. 62/910,953, filed on Oct. 4, 2019, entitled "NARROWBAND REFERENCE SIGNAL FOR UE-SPECIFIC DISCONTINUOUS RECEPTION CYCLE," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for a narrowband reference signal (NRS) for a user equipment (UE) specific discontinuous reception (DRX) cycle.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include identifying a set of time instances to monitor for paging, wherein the set of time instances are identified based at least in part on a first discontinuous reception (DRX) cycle parameter set, identifying a subset of time instances, of the set of time instances, for which a narrowband reference signal (NRS) is to be monitored irrespective of whether paging is present on the subset of time instances, wherein the subset of time instances is identified based at least on a second DRX cycle parameter set; and communicating based at least on the set of time instances and the subset of time instances.

In some aspects, a method of wireless communication, performed by a base station, may include identifying a set of time instances for paging associated with a UE, wherein the set of time instances are identified based at least in part on a first DRX cycle parameter set, identifying a subset of time instances, of the set of time instances, for which an NRS is to be transmitted irrespective of whether paging is transmitted on the subset of time instances, wherein the subset of time instances is identified based at least on a second DRX cycle parameter set; and communicating based at least on the set of time instances and the subset of time instances.

In some aspects, a UE for wireless communication may include memory and one or more processors coupled to the memory. The memory may include instructions executable by the one or more processors to cause the UE to identify a set of time instances to monitor for paging, wherein the set of time instances are identified based at least in part on a first DRX cycle parameter set, identify a subset of time instances, of the set of time instances, for which an NRS is to be monitored irrespective of whether paging is present on the subset of time instances, wherein the subset of time instances is identified based at least on a second DRX cycle parameter set; and communicate based at least on the set of time instances and the subset of time instances.

In some aspects, a base station for wireless communication may include memory and one or more processors coupled to the memory. The memory may include instructions executable by the one or more processors to cause the base station to identify a set of time instances for paging associated with a UE, wherein the set of time instances are identified based at least in part on a first DRX cycle parameter set, identify a subset of time instances, of the set of time instances, for which an NRS is to be transmitted irrespective of whether paging is transmitted on the subset of time instances, wherein the subset of time instances is identified based at least on a second DRX cycle parameter set; and communicate based at least on the set of time instances and the subset of time instances.

In some aspects, a non-transitory computer-readable medium may store one or more instructions for wireless communication. The one or more instructions, when executed by one or more processors of a UE, may cause the one or more processors to: identify a set of time instances to monitor for paging, wherein the set of time instances are identified based at least in part on a first DRX cycle parameter set, identify a subset of time instances, of the set of time instances, for which an NRS is to be monitored irrespective of whether paging is present on the subset of time instances, wherein the subset of time instances is identified based at least on a second DRX cycle parameter set; and communicate based at least on the set of time instances and the subset of time instances.

In some aspects, a non-transitory computer-readable medium may store one or more instructions for wireless communication. The one or more instructions, when executed by one or more processors of a base station, may cause the one or more processors to: identify a set of time instances for paging associated with a UE, wherein the set of time instances are identified based at least in part on a first DRX cycle parameter set, identify a subset of time instances, of the set of time instances, for which an NRS is to be transmitted irrespective of whether paging is transmitted on the subset of time instances, wherein the subset of time instances is identified based at least on a second DRX cycle parameter set; and communicate based at least on the set of time instances and the subset of time instances.

In some aspects, an apparatus for wireless communication may include means for identifying a set of time instances to monitor for paging, wherein the set of time instances are identified based at least in part on a first DRX cycle parameter set, means for identifying a subset of time instances, of the set of time instances, for which an NRS is to be monitored irrespective of whether paging is present on the subset of time instances, wherein the subset of time instances is identified based at least on a second DRX cycle parameter set; and means for communicating based at least on the set of time instances and the subset of time instances.

In some aspects, an apparatus for wireless communication may include means for identifying a set of time instances for paging associated with a UE, wherein the set of time instances are identified based at least in part on a first DRX cycle parameter set, means for identifying a subset of time instances, of the set of time instances, for which an NRS is to be transmitted irrespective of whether paging is transmitted on the subset of time instances, wherein the subset of time instances is identified based at least on a second DRX cycle parameter set; and means for communicating based at least on the set of time instances and the subset of time instances.

Aspects generally include a method, apparatus, system, computer program product, non-transitory computer-readable medium, user equipment, base station, wireless communication device, and/or processing system as substantially described herein with reference to and as illustrated by the accompanying drawings, specification, and appendices.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
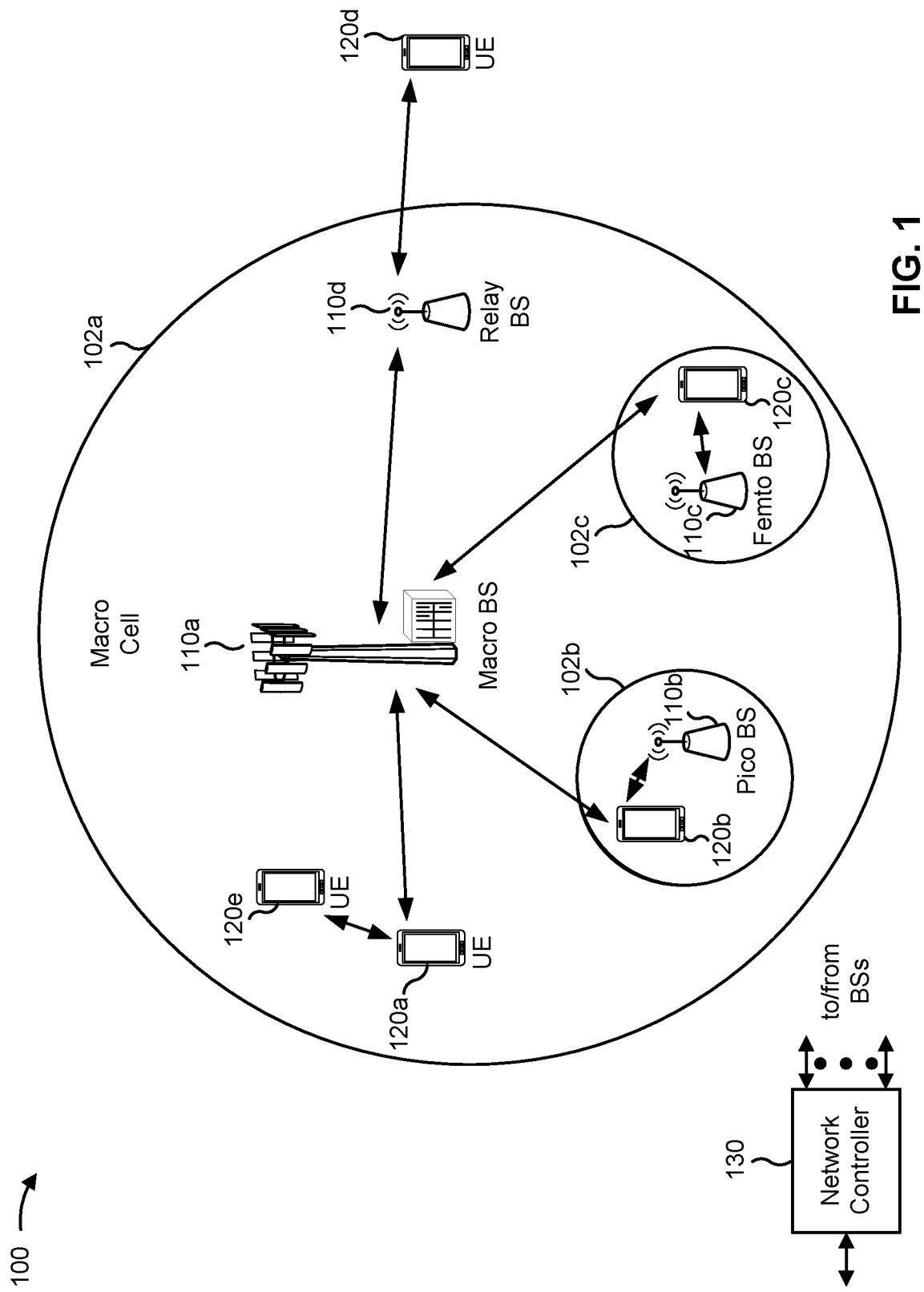
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another (e.g., directly or indirectly) via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz to 300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
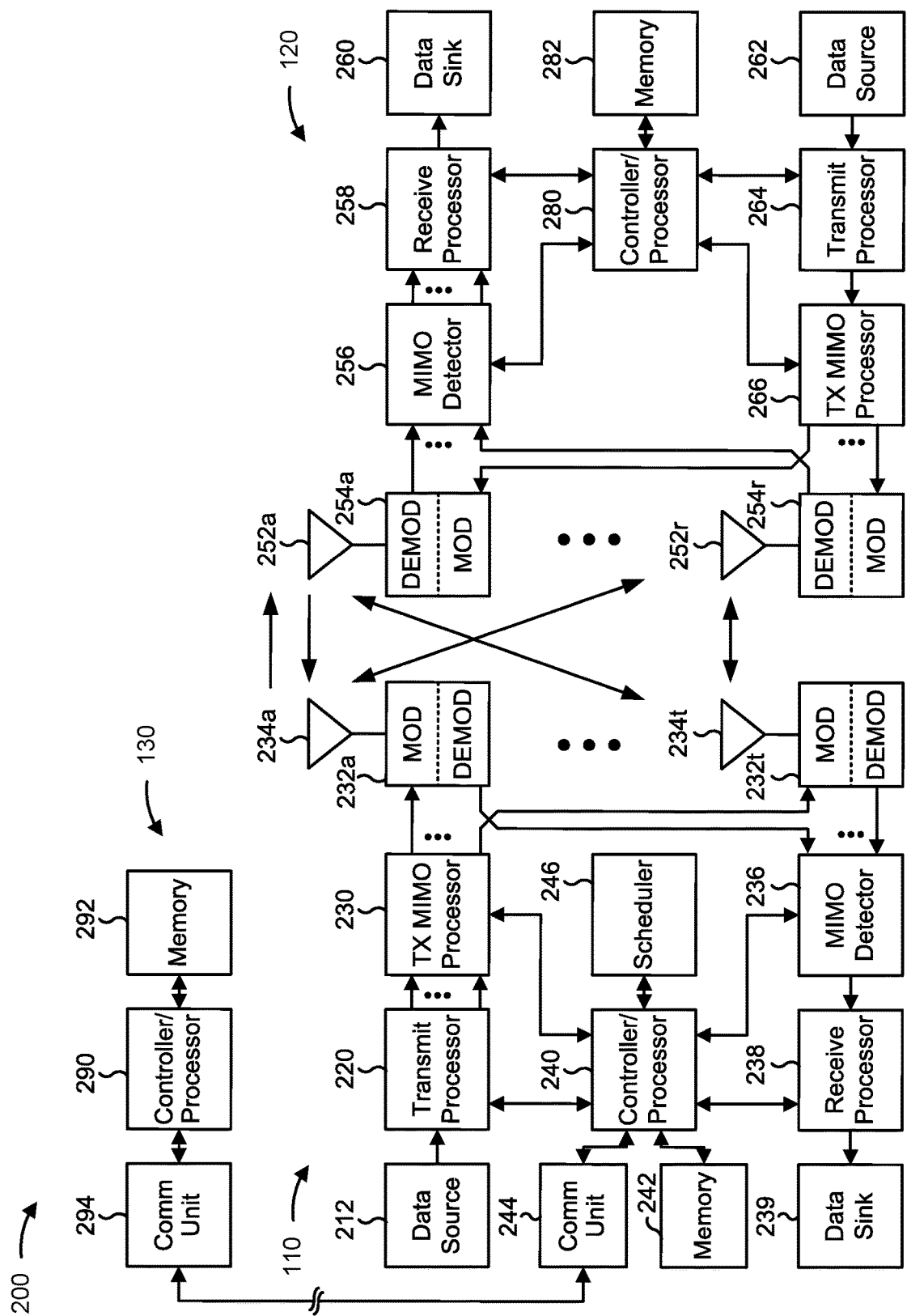
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with narrowband reference signal (NRS) signaling for UE-specific discontinuous reception (DRX) configurations, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, process 800 of FIG. 8, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 600 of FIG. 6, process 700 of FIG. 7, process 800 of FIG. 8, and/or other processes as described herein. A scheduler 246 may schedule UEs for data transmission on the downlink and/or uplink.

In some aspects, UE 120 may include means for identifying a set of time instances to monitor for paging, wherein the set of time instances are identified based at least in part on a first DRX cycle parameter set; means for identifying a subset of time instances, of the set of time instances, for which an NRS is to be monitored irrespective of whether paging is present on the subset of time instances, wherein the subset of time instances is identified based at least on a second DRX cycle parameter set; means for communicating based at least on the set of time instances and the subset of time instances; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for identifying a set of time instances for paging associated with a UE, wherein the set of time instances are identified based at least in part on a first DRX cycle parameter set; means for identifying a subset of time instances, of the set of time instances, for which an NRS is to be transmitted irrespective of whether paging is transmitted on the subset of time instances, wherein the subset of time instances is identified based at least on a second DRX cycle parameter set; means for communicating based at least on the set of time instances and the subset of time instances; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Some types of UEs, such as low-power UEs or high-efficiency UEs (e.g., IoT UEs, NB-IoT UEs, eMTC UEs, and/or the like) may communicate using a narrow band relative to a baseline bandwidth. A narrowband reference signal (NRS) may be used as a cell-specific reference signal for narrowband deployments. An NRS may be used by the UE for cell search and initial acquisition, downlink channel quality measurements, channel estimation for coherent demodulation and/or detection at the UE, and/or the like. In some aspects, the NRS may be transmitted in a non-anchor carrier. For example, the NRS may be transmitted in the non-anchor carrier whether or not paging is present on a paging occasion that includes the NRS. To reduce overhead associated with the NRS, not all paging occasions may have an associated NRS. For example, for a case with a large density of paging occasions, every other paging occasion may have an NRS.

A UE may monitor for paging based at least in part on a discontinuous reception (DRX) cycle. For example, the DRX cycle may specify how often a UE is to monitor a paging occasion for paging. A paging message may include downlink control information (DCI) scrambled with a paging radio network temporary identifier (P-RNTI) for a UE to which the paging message is directed. In some aspects, a DRX cycle may be defined based at least in part on a DRX cycle parameter, which may identify a number of radio frames (or an amount of time corresponding to the number of radio frames) in between each paging occasion for which the UE is to monitor for paging. For example, a DRX cycle parameter (T) of 1024 radio frames may mean that a UE awakes on every $1024^{th}$ radio frame to monitor a paging occasion for paging.

The combination of (i) not all paging occasions having an associated NRS and (ii) the DRX cycle of the UE may lead to potential unfairness across UEs, since some UEs may always detect an NRS, and other UEs may never detect an NRS. For example, consider the case of one paging occasion per radio frame, a DRX cycle parameter of 1024 radio frames, and NRSs on every other paging occasion (and therefore every other radio frame, since there is one paging occasion per radio frame). In this case, with 1024 UE groups (where a UE group of a UE is identified by UE_ID mod 1024), the presence of an NRS may be as shown in Table 1:

TABLE 1

| Radio Frame | UE group | NRS |
|---|---|---|
| 0 | 0 | Yes |
| 1 | 1 | No |
| 2 | 2 | Yes |
| 3 | 3 | No |
| 4 | 4 | Yes |
| 5 | 5 | No |
| ... | ... | ... |
| 1023 | 1023 | No |
| 1024 | 0 | Yes |
| 1025 | 1 | No |

It can be seen that even-indexed UE groups may always be associated with an NRS, whereas odd-indexed UE groups may never be associated with an NRS. In some aspects, an offset may be used so that the UE groups that are associated with an NRS in a first DRX cycle are not associated with the NRS in a second DRX cycle, and so that UE groups that are associated with no NRS in the first DRX cycle are associated with an NRS in the second DRX cycle, as shown in Table 2:

TABLE 2

| Radio Frame | UE group | NRS |
|---|---|---|
| 0 | 0 | Yes |
| 1 | 1 | No |
| 2 | 2 | Yes |
| 3 | 3 | No |
| 4 | 4 | Yes |
| 5 | 5 | No |
| ... | ... | ... |
| 1023 | 1023 | No |
| 1024 | 0 | No |
| 1025 | 1 | Yes |

Generally, the equation for the presence of the NRS on a given radio frame may be of the form:

$$R = (\text{PO\_Index} + (X \text{ div } T)) \bmod 2, \text{ where:}$$

PO_Index is the index of the paging occasion (PO) within one DRX cycle:

PO_Index=(SFN/Ns*N+i_s) mod T,

X=system frame number (SFN)+1024*H-SFN, and

T is the DRX cycle measured in radio frames.

If R=1, the PO is associated with an NRS. If R=0, the PO is not associated with an NRS. A paging occasion may be referred to herein as being associated with a time instance. For example, a UE may identify a set of time instances associated with paging occasions, a set of time instances associated with NRSs, and/or the like.

The above configurations may be for cell-specific DRX cycles (e.g., configured for a particular cell). However, in some aspects, a DRX cycle may be UE-specific. For example, a UE may be configured with a DRX cycle parameter specific to the UE, and may monitor for paging based at least in part on the UE-specific DRX cycle parameter and/or a cell-specific DRX cycle parameter. In this case, if each UE follows a respective UE-specific DRX cycle to derive the presence of the NRS, network overhead may be increased because the base station may need to transmit an NRS on a given paging occasion if any one or more UEs expects an NRS on the given paging occasion.

Some techniques and apparatuses described herein provide for the determination of a set of time instances associated with paging occasions, and a subset of time instances, of the set of time instances, associated with NRSs. For example, the UE may determine the set of time instances based at least in part on a first DRX cycle parameter set (e.g., associated with one or more first DRX cycles, such as a cell-specific DRX cycle, a UE-specific DRX cycle, and/or the like) and may determine the subset of time instances based at least in part on a second DRX cycle parameter set (e.g., associated with one or more second DRX cycles, such as a cell-specific DRX cycle, a UE-specific DRX cycle, and/or the like). The determination of the subset of time instances may reduce the number of NRSs to be transmitted by the base station, as described in more detail elsewhere herein. Thus, network overhead and communication resource utilization may be reduced and communication resources of the base station may be conserved.

Figure 3:
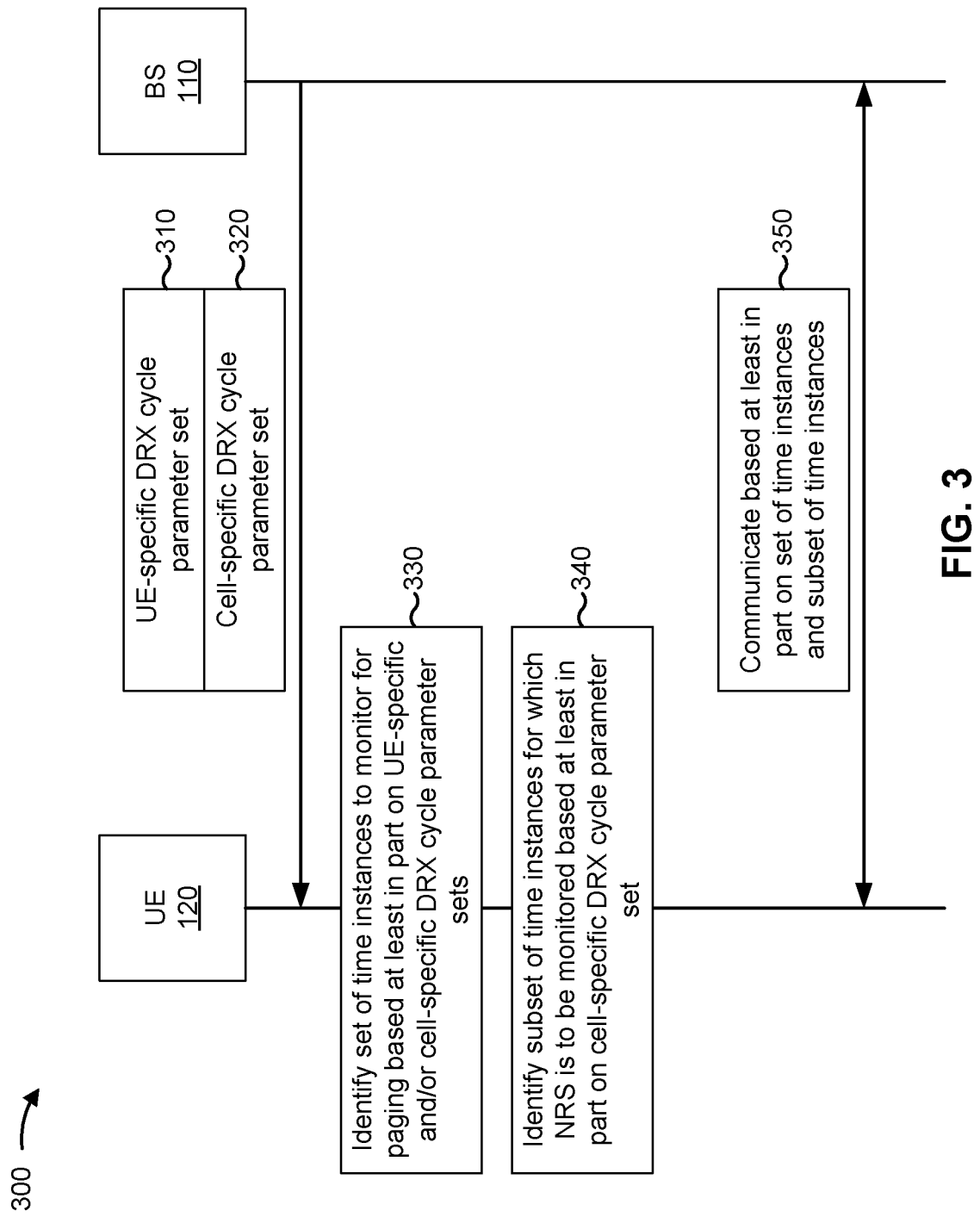
FIG. 3 is a diagram illustrating an example of determination of narrowband reference signal (NRS) time instances using a cell-specific discontinuous (DRX) cycle parameter set, in accordance with various aspects of the present disclosure.
Figure 4:
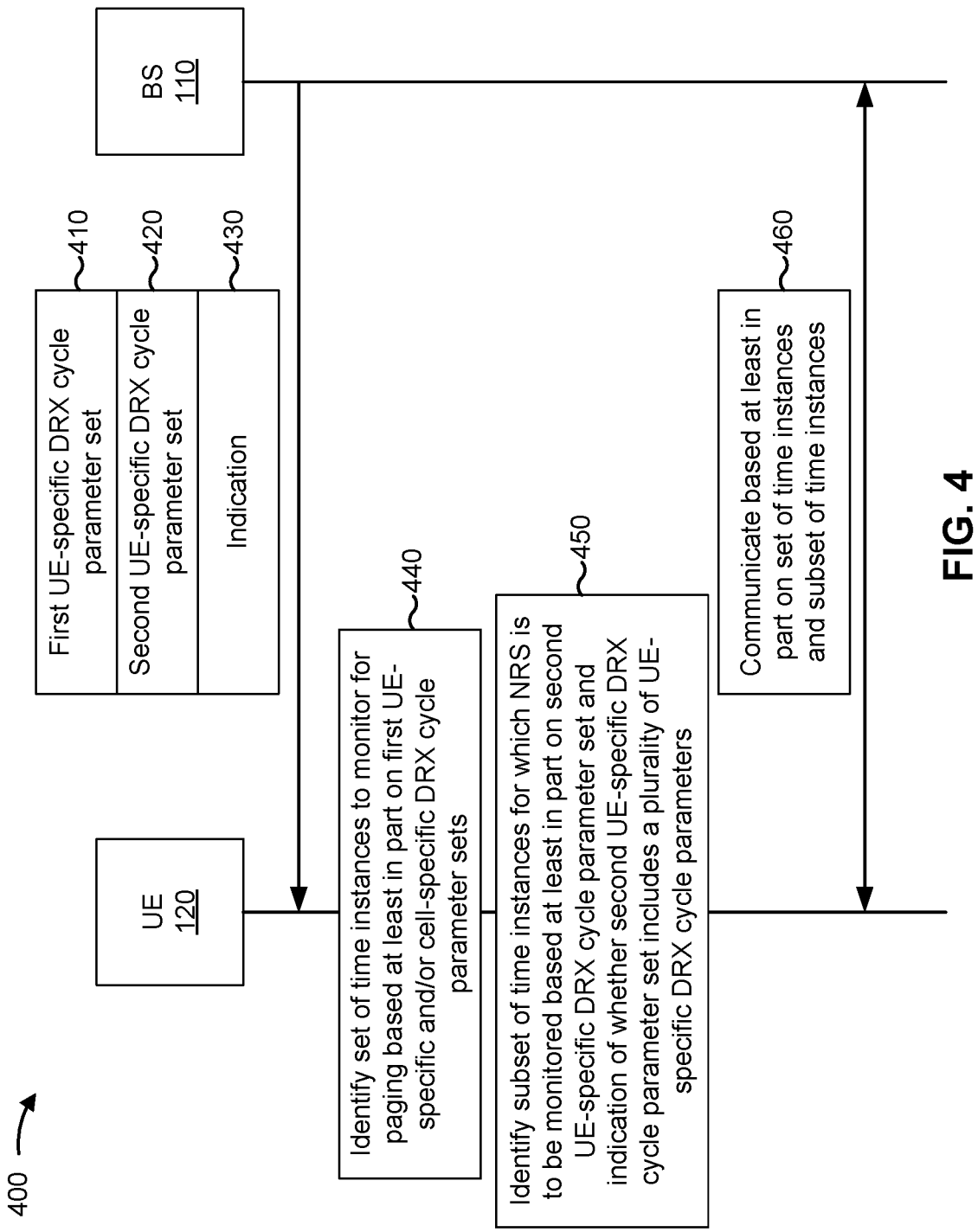
FIG. 4 is a diagram illustrating an example of determination of NRS time instances using a cell-specific DRX cycle parameter set, in accordance with various aspects of the present disclosure.
Figure 5:
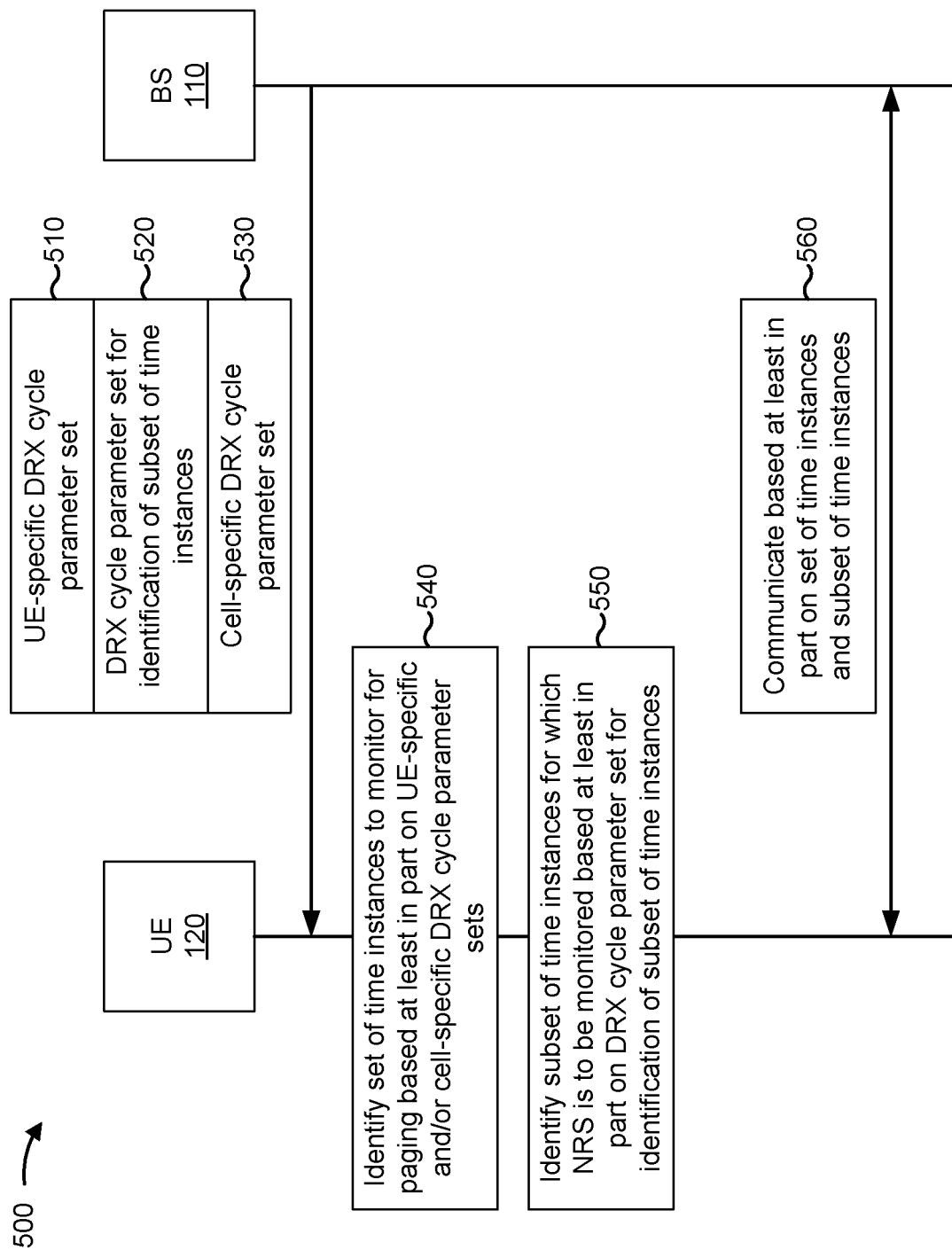
FIG. 5 is a diagram illustrating an example of determination of NRS time instances using a DRX cycle parameter set that is for identification of the NRS time instances, in accordance with various aspects of the present disclosure.

FIG. 3 is a diagram illustrating an example 300 of determination of NRS time instances using a cell-specific DRX cycle parameter set, in accordance with various aspects of the present disclosure. As shown in FIG. 3, example 300 includes a UE 120 and a BS 110. While the operations described in connection with FIGS. 3-5 are shown as performed by a single BS 110, in some aspects, some or all of these operations may be performed by two or more different BSs 110 or a network associated with the BS 110 (e.g., a gNB, a central unit, a network controller, and/or the like).

As shown in FIG. 3, and by reference number 310, the BS 110 may provide information identifying a UE-specific DRX cycle parameter set to the UE 120. For example, the UE-specific DRX cycle parameter set may identify a DRX cycle length (e.g., a value of T) to be used by the UE 120. In some aspects, the BS 110 may configure multiple UEs 120 (e.g., UEs 120 covered by the BS 110 or connected to a cell provided by the BS 110) with respective UE-specific DRX cycle parameter sets. In some cases, the UE-specific DRX cycle may be set by a network entity other than the BS 110 (e.g., a mobility management entity (MME) and/or the like), and the BS 110 may transmit this configuration over the air interface to the UE 120. In some aspects, the information identifying a UE-specific DRX cycle parameter set may be communicated via radio resource control (RRC) signaling and/or the like.

As shown by reference number 320, the BS 110 may provide information identifying a cell-specific DRX cycle parameter set to the UE 120. For example, the cell-specific DRX cycle parameter set may identify a DRX cycle length (e.g., a value of T) that is associated with a cell provided by the BS 110. In some aspects, the BS 110 may configure UEs 120 covered by the BS 110 or connected to the cell provided by the BS 110 with the cell-specific DRX cycle parameter set.

As shown by reference number 330, the UE 120 may identify a set of time instances to monitor for paging (e.g., a set of paging occasions) based at least in part on the UE-specific DRX cycle parameter set and/or the cell-specific DRX cycle parameter set. For example, the UE 120 may identify the set of paging occasions using a smaller value of the UE-specific DRX cycle parameter set and the cell-specific DRX cycle parameter set. More particularly, if the UE-specific cycle parameter set is T=512 radio frames and the cell-specific DRX cycle parameter is T=1024 radio frames, then the UE 120 may identify a paging occasion every 512 radio frames. In some aspects, the UE 120 may use a larger value of the UE-specific DRX cycle parameter and the cell-specific DRX cycle parameter, or a different combination of the UE-specific DRX cycle parameter and the cell-specific DRX cycle parameter.

As shown by reference number 340, the UE 120 may identify a subset of time instances for which the NRS is to be monitored based at least in part on the cell-specific DRX cycle parameter set. The subset of time instances may be a subset (e.g., a proper subset or another type of subset) of the set of time instances. In some aspects, the UE 120 may identify the subset of time instances in the form shown by the below formula:

$$R=(PO\_Index+(X \text{ div } T)) \bmod 2,$$

where:

PO_Index is the index of the PO within one DRX cycle:

PO_Index=(SFN*Ns*N/T+i_s),

X=SFN+1024*H-SFN, and

T is the cell specific DRX cycle measured in radio frames. The variables used in the above formula are defined in, for example, 3GPP Technical Specification 36.304.

In the above formula, if R=1, then the corresponding PO is associated with an NRS. If R=0, then the PO is not associated with an NRS. Thus, the number of POs associated with an NRS is reduced relative to determining the NRS association in accordance with UE-specific DRX cycle configurations of a plurality of UEs. Therefore, network overhead is reduced relative to transmitting NRSs for each of the plurality of UEs in accordance with the respective UE-specific DRX cycle configurations.

As shown by reference number 350, the UE 120 and the BS 110 may communicate based at least in part on the set of time instances and the subset of time instances. For example, the BS 110 may transmit paging on one or more time instances of the set of time instances. As another example, the BS 110 may transmit an NRS on one or more of the subset of time instances. The UE 120 may monitor for paging on the set of time instances and may monitor for an NRS on the subset of time instances.

As indicated above, FIG. 3 is provided as an example. Other examples may differ from what is described with respect to FIG. 3.

FIG. 4 is a diagram illustrating an example 400 of determination of NRS time instances using a cell-specific DRX cycle parameter set, in accordance with various aspects of the present disclosure. As shown in example 400, the BS 110 may configure the UE 120 with a first UE-specific DRX cycle parameter set (shown by reference number 410) and a second DRX cycle parameter set (shown by reference number 420).

As shown by reference number 430, the BS 110 may provide an indication to the UE 120. The indication may indicate whether the second DRX cycle parameter set includes a single DRX cycle parameter or a plurality of DRX cycle parameters, described in more detail below. It should be noted that, in some aspects, the BS 110 may not provide the information shown by reference number 420. For example, the UE 120 may determine the information shown by reference number 420. In some aspects, a specification may define whether the second DRX cycle parameter set includes a single parameter or a plurality of parameters. In some aspects, the indication shown by reference number 430 may be explicit (e.g., a bit in a system information block), or may be implicit. In such a case, if the UE 120 receives a system information block parameter indicating support of UE-specific DRX and if the parameter is set to ON, then the UE 120 may determine that the second DRX cycle parameter includes a plurality of parameters. Otherwise, the UE 120 may determine that the second DRX cycle parameter includes a single parameter.

As shown by reference number 440, the UE 120 may identify the set of time instances based at least in part on the first UE-specific DRX cycle parameter set and/or based at least in part on a cell-specific DRX cycle parameter set. The configuration of the cell-specific DRX cycle parameter set is not shown in FIG. 4. The identification of the set of time instances in accordance with the first UE-specific DRX cycle parameter set and/or the cell-specific DRX cycle parameter set is described in more detail in connection with FIG. 3.

As shown by reference number 450, the UE 120 may identify the subset of time instances based at least in part on the second DRX cycle parameter set. For example, the UE 120 may identify the subset of time instances based at least in part on whether the second DRX cycle parameter set includes a single UE-specific DRX cycle parameter (e.g., a single value of T), or multiple UE-specific DRX cycle parameters (e.g., multiple values of T), as indicated by the indication.

In the case that the second DRX cycle parameter set includes a single UE-specific DRX cycle parameter, the UE 120 may identify the subset of time instances using the single UE-specific DRX cycle parameter, as described in connection with reference number 340 of FIG. 3.

In the case that the second DRX cycle parameter includes a plurality of UE-specific DRX cycle parameters, the UE 120 may identify the subset of time instances as follows:

$$R=(PO\_Index+\Sigma_{i=1}^{N}(X \text{ div } T_i)) \text{mod } 2.$$

In some aspects, the plurality of UE-specific DRX cycle parameters (e.g., i=1 through N) may include all UE-specific DRX cycle lengths that are configurable for the UE 120. In some aspects, the plurality of UE-specific DRX cycle parameters may include all UE-specific DRX cycle lengths that are configurable for the UE 120 and are shorter than the cell-specific DRX cycle configuration of the UE 120. In some aspects, the plurality of UE-specific DRX cycle parameters may include all UE-specific DRX cycle lengths that are configured for the UE 120 in connection with reference number 420.

As shown by reference number 460, the BS 110 and the UE 120 may communicate based at least in part on the set of time instances and the subset of time instances. This is described in more detail in connection with FIG. 3.

FIG. 5 is a diagram illustrating an example 500 of determination of NRS time instances using a DRX cycle parameter set that is for identification of the NRS time instances, in accordance with various aspects of the present disclosure. As shown in example 500, the BS 110 may configure the UE 120 with a UE-specific DRX cycle parameter set (shown by reference number 510) and a DRX cycle parameter set for identification of the subset of time instances (shown by reference number 520). As shown by reference number 530, the BS 110 may configure the UE 120 with a cell-specific DRX cycle parameter set.

As shown by reference number 540, the UE 120 may identify the set of time instances based at least in part on the UE-specific DRX cycle parameter set and/or based at least in part on the cell-specific DRX cycle parameter set. The identification of the set of time instances in accordance with the UE-specific DRX cycle parameter set and the cell-specific DRX cycle parameter set is described in more detail in connection with FIG. 3.

As shown by reference number 550, the UE 120 may identify the subset of time instances based at least in part on the DRX cycle parameter set for identification of the subset of time instances. For example, the DRX cycle parameter set for identification of the subset of time instances may identify a value T', and the UE 120 may identify the subset of time instances as follows:

$$R=(PO\_Index+(X \text{ div } T')) \text{ mod } 2,$$

where:
PO_Index is the index of the PO within one DRX cycle:
 PO_Index=(SFN*Ns*N/T'+i_s), and
X=SFN+1024*H-SFN.

As shown by reference number 560, the BS 110 and the UE 120 may communicate based at least in part on the set of time instances and the subset of time instances. This is described in more detail in connection with FIG. 3.

It should be noted that, in examples 300, 400, and 500, the BS 110 may perform operations similar to those described in connection with reference numbers 330, 340, 440, 450, 540, and 550. For example, the BS 110 may identify a set of time instances for paging, and may identify a subset of time instances for which the NRS is to be transmitted, in accordance with the procedures described in connection with reference numbers 330, 340, 440, 450, 540, and 550. The BS 110 may transmit the NRS on the subset of time instances.

As indicated above, FIGS. 3-5 are provided as one or more examples. Other examples may differ from what is described with respect to FIGS. 3-5.

Figure 6:
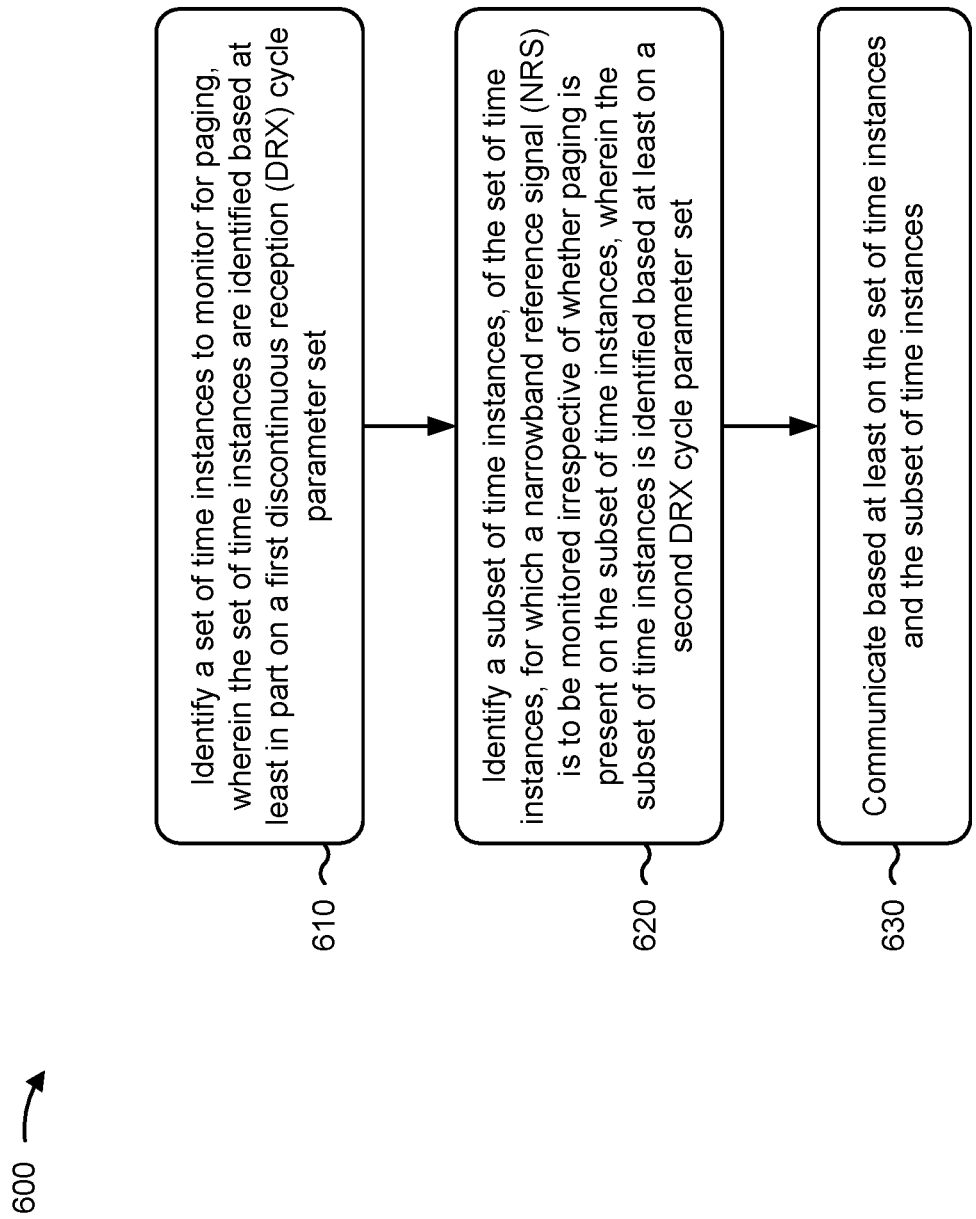
FIG. 6 is a diagram illustrating an example process performed, for example, by a user equipment, in accordance with various aspects of the present disclosure.

FIG. 6 is a diagram illustrating an example process 600 performed, for example, by a UE, in accordance with various aspects of the present disclosure. Example process 600 is an example where the UE (e.g., UE 120 and/or the like) performs operations associated with NRS for a UE-specific discontinuous reception cycle.

As shown in FIG. 6, in some aspects, process 600 may include identifying a set of time instances to monitor for paging, wherein the set of time instances are identified based at least in part on a first discontinuous reception (DRX) cycle parameter set (block 610). For example, the UE (e.g., using controller/processor 280 and/or the like) may identify a set of time instances to monitor for paging, as described above. In some aspects, the set of time instances are identified based at least in part on a first DRX cycle parameter set.

As further shown in FIG. 6, in some aspects, process 600 may include identifying a subset of time instances, of the set of time instances, for which a narrowband reference signal (NRS) is to be monitored irrespective of whether paging is present on the subset of time instances, wherein the subset of time instances is identified based at least on a second DRX cycle parameter set (block 620). For example, the UE (e.g., using receive processor 258, transmit processor 264, controller/processor 280, memory 282, and/or the like) may identify a subset of time instances, of the set of time instances, for which an NRS is to be monitored irrespective of whether paging is present on the subset of time instances, as described above. In some aspects, the subset of time instances is identified based at least on a second DRX cycle parameter set.

As further shown in FIG. 6, in some aspects, process 600 may include communicating based at least on the set of time instances and the subset of time instances (block 630). For example, the UE (e.g., using receive processor 258, transmit processor 264, controller/processor 280, memory 282, and/or the like) may communicate based at least on the set of time instances and the subset of time instances, as described above.

Process 600 may include additional aspects, such as any single aspect or any combination of aspects described below and/or in connection with one or more other processes described elsewhere herein.

In a first aspect, the first DRX cycle parameter set comprises a UE-specific DRX cycle length, and the second DRX cycle parameter set comprises a cell-specific DRX cycle length of a cell of the UE.

In a second aspect, alone or in combination with the first aspect, identifying the set of time instances is based at least in part on the first DRX cycle parameter set and the second DRX cycle parameter set.

In a third aspect, alone or in combination with one or more of the first and second aspects, the first DRX cycle parameter set comprises a UE-specific DRX cycle length, and the second DRX cycle parameter set comprises a plurality of UE-specific DRX cycle lengths.

In a fourth aspect, alone or in combination with one or more of the first through third aspects, the plurality of UE-specific DRX cycle lengths include all UE-specific DRX cycle lengths configurable for the UE.

In a fifth aspect, alone or in combination with one or more of the first through fourth aspects, the plurality of UE-specific DRX cycle lengths include all UE-specific DRX cycle lengths shorter than or equal to a cell-specific DRX cycle length of a cell of the UE.

In a sixth aspect, alone or in combination with one or more of the first through fifth aspects, the plurality of UE-specific DRX cycle lengths are configured for the UE.

In a seventh aspect, alone or in combination with one or more of the first through sixth aspects, process 600 includes receiving an indication of whether the second DRX cycle parameter set includes a plurality of DRX cycle configurations or a single DRX cycle configuration.

In an eighth aspect, alone or in combination with one or more of the first through seventh aspects, the first DRX cycle parameter set corresponds to a UE-specific DRX cycle length, and the second DRX cycle parameter set corresponds to a DRX cycle length for identification of the subset of time instances associated with the NRS.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
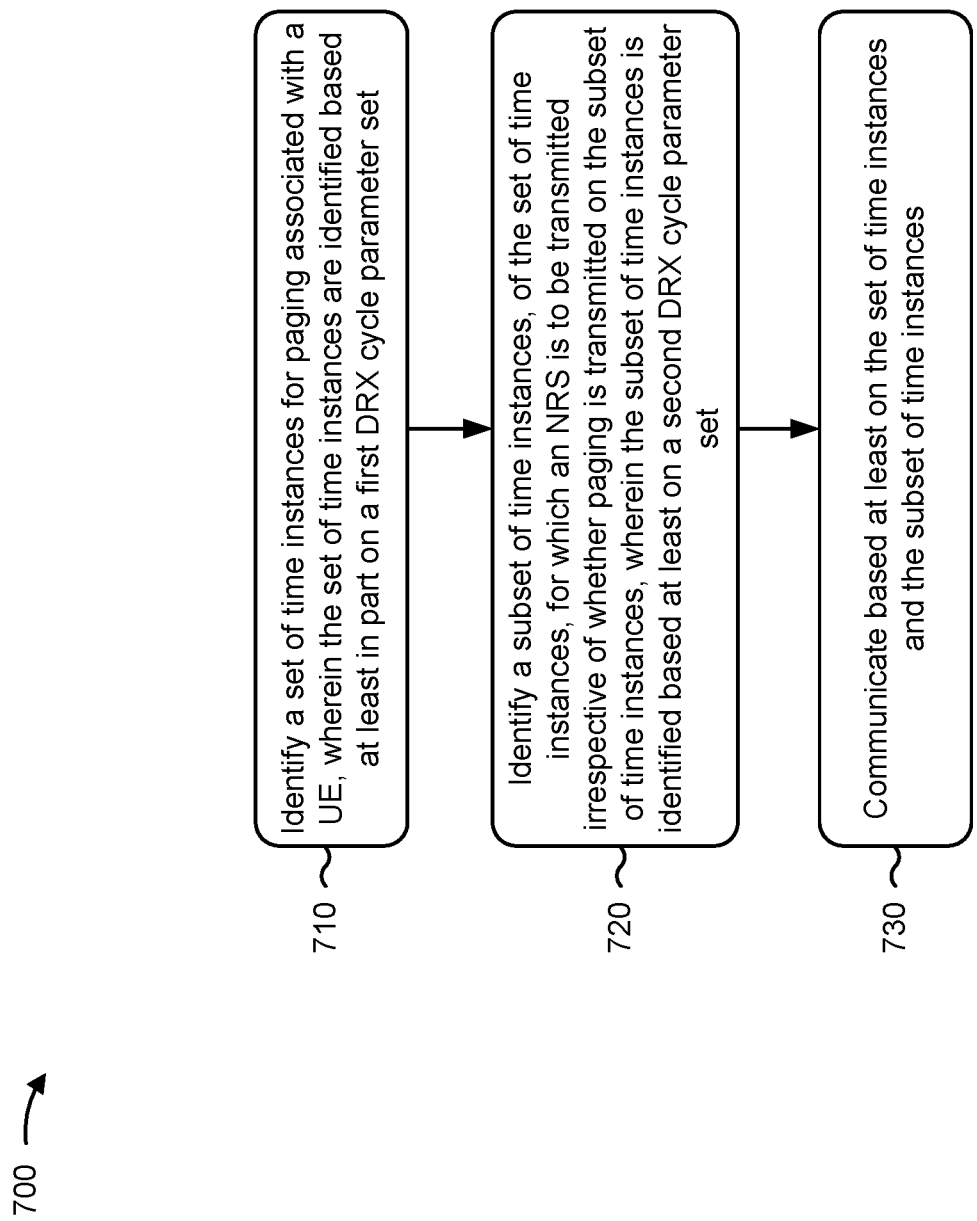
FIG. 7 is a diagram illustrating an example process performed, for example, by a base station, in accordance with various aspects of the present disclosure.

FIG. 7 is a diagram illustrating an example process 700 performed, for example, by a base station, in accordance with various aspects of the present disclosure. Example process 700 is an example where the base station (e.g., base station 110 and/or the like) performs operations associated with NRS for a UE-specific DRX cycle.

As shown in FIG. 7, in some aspects, process 700 may include identifying a set of time instances for paging associated with a UE, wherein the set of time instances are identified based at least in part on a first DRX cycle parameter set (block 710). For example, the base station (e.g., using controller/processor 240 and/or the like) may identify a set of time instances for paging associated with a UE, as described above. In some aspects, the set of time instances are identified based at least in part on a first DRX cycle parameter set.

As further shown in FIG. 7, in some aspects, process 700 may include identifying a subset of time instances, of the set of time instances, for which an NRS is to be transmitted irrespective of whether paging is transmitted on the subset of time instances, wherein the subset of time instances is identified based at least on a second DRX cycle parameter set (block 720). For example, the base station (e.g., using controller/processor 240, transmit processor 220, TX MIMO processor 230, MOD 232, antenna 234, and/or the like) may identify a subset of time instances, of the set of time instances, for which an NRS is to be transmitted irrespective of whether paging is transmitted on the subset of time instances, as described above. In some aspects, the subset of time instances is identified based at least on a second DRX cycle parameter set.

As further shown in FIG. 7, in some aspects, process 700 may include communicating based at least on the set of time instances and the subset of time instances (block 730). For example, the base station (e.g., using controller/processor 240, transmit processor 220, TX MIMO processor 230, MOD 232, antenna 234, and/or the like) may communicate based at least on the set of time instances and the subset of time instances, as described above.

Process 700 may include additional aspects, such as any single aspect or any combination of aspects described below and/or in connection with one or more other processes described elsewhere herein.

In a first aspect, the first DRX cycle parameter set comprises a UE-specific DRX cycle length of the UE, and the second DRX cycle parameter set comprises a cell-specific DRX cycle length of the base station.

In a second aspect, alone or in combination with the first aspect, identifying the set of time instances is based at least in part on the first DRX cycle parameter set and the second DRX cycle parameter set.

In a third aspect, alone or in combination with one or more of the first and second aspects, the first DRX cycle parameter set comprises a UE-specific DRX cycle length, and the second DRX cycle parameter set comprises a plurality of UE-specific DRX cycle lengths.

In a fourth aspect, alone or in combination with one or more of the first through third aspects, the plurality of UE-specific DRX cycle lengths include all UE-specific DRX cycle lengths configurable for the UE.

In a fifth aspect, alone or in combination with one or more of the first through fourth aspects, the plurality of UE-specific DRX cycle lengths include all UE-specific DRX cycle lengths shorter than or equal to a cell-specific DRX cycle length of the base station.

In a sixth aspect, alone or in combination with one or more of the first through fifth aspects, process 700 includes configuring the plurality of UE-specific DRX cycle lengths for the UE.

In a seventh aspect, alone or in combination with one or more of the first through sixth aspects, process 700 includes transmitting an indication of whether the second DRX cycle parameter set includes a plurality of DRX cycle configurations or a single DRX cycle configuration.

In an eighth aspect, alone or in combination with one or more of the first through seventh aspects, the first DRX cycle parameter set corresponds to a UE-specific DRX cycle length, and the second DRX cycle parameter set corresponds to a DRX cycle length for identification of the subset of time instances associated with the NRS.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, software, and/or a combination of hardware and software. As used herein, a processor is implemented in hardware, software, and/or a combination of hardware and software. Software is to be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, software, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving information identifying a first discontinuous reception (DRX) cycle parameter set and a second DRX cycle parameter set;
   identifying a set of paging occasions for the UE to monitor for paging, wherein the set of paging occasions is identified based at least on a comparison between at least a first DRX parameter value of the first DRX cycle parameter set and a second DRX parameter value of the second DRX cycle parameter set to identify a minimum of at least the first DRX parameter value and the second DRX parameter value, wherein the second DRX cycle parameter set comprises a cell-specific DRX cycle length of a cell of the UE;
   identifying a set of time instances for which a narrowband reference signal (NRS) is to be monitored irrespective of whether paging is present on the set of time instances, wherein the set of time instances is identified based at least on the second DRX cycle parameter set; and
   communicating based at least on the set of paging occasions and the set of time instances.

2. The method of claim 1, wherein the first DRX cycle parameter set comprises a UE-specific DRX cycle length, and the second DRX cycle parameter set comprises a cell-specific DRX cycle parameter set.

3. The method of claim 1, wherein the second DRX cycle parameter set comprises a plurality of UE-specific DRX cycle lengths.

4. The method of claim 3, wherein the plurality of UE-specific DRX cycle lengths includes all UE-specific DRX cycle lengths configurable for the UE.

5. The method of claim 3, wherein the plurality of UE-specific DRX cycle lengths includes all UE-specific DRX cycle lengths shorter than or equal to the cell-specific DRX cycle length.

6. The method of claim 3, wherein the plurality of UE-specific DRX cycle lengths are configured for the UE.

7. The method of claim 1, further comprising:
   receiving an indication of whether the second DRX cycle parameter set includes a plurality of DRX cycle configurations or a single DRX cycle configuration.

8. The method of claim 1, wherein the first DRX cycle parameter set corresponds to a UE-specific DRX cycle length, and wherein the second DRX cycle parameter set corresponds to a DRX cycle length for identification of the set of time instances associated with the NRS.

9. A method of wireless communication performed by a network entity, comprising:
- transmitting information identifying a first discontinuous reception (DRX) cycle parameter set and a second DRX cycle parameter set;
- identifying a set of paging occasions associated with a user equipment (UE), wherein the set of paging occasions is identified based at least on a comparison between at least a first DRX parameter value of the first DRX cycle parameter set and a second DRX parameter value of the second DRX cycle parameter set to identify a minimum of at least the first DRX parameter value and the second DRX parameter value, wherein the second DRX cycle parameter set comprises a cell-specific DRX cycle length of the network entity;
- identifying a set of time instances for which a narrowband reference signal (NRS) is to be transmitted irrespective of whether paging is transmitted on the set of time instances, wherein the set of time instances is identified based at least on the second DRX cycle parameter set; and
- communicating based at least on the set of paging occasions and the set of time instances.

10. The method of claim 9, wherein the first DRX cycle parameter set comprises a UE-specific DRX cycle length of the UE, and the second DRX cycle parameter set comprises a cell-specific DRX cycle parameter set.

11. The method of claim 9, wherein the first DRX cycle parameter set comprises a UE-specific DRX cycle length, and the second DRX cycle parameter set comprises a plurality of UE-specific DRX cycle lengths.

12. The method of claim 11, wherein the plurality of UE-specific DRX cycle lengths includes all UE-specific DRX cycle lengths configurable for the UE.

13. The method of claim 11, wherein the plurality of UE-specific DRX cycle lengths includes all UE-specific DRX cycle lengths shorter than or equal to the cell-specific DRX cycle length.

14. The method of claim 11, further comprising:
- configuring the plurality of UE-specific DRX cycle lengths for the UE.

15. The method of claim 9, further comprising:
- transmitting an indication of whether the second DRX cycle parameter set includes a plurality of DRX cycle configurations or a single DRX cycle configuration.

16. The method of claim 9, wherein the first DRX cycle parameter set corresponds to a UE-specific DRX cycle length, and wherein the second DRX cycle parameter set corresponds to a DRX cycle length for identification of the set of time instances associated with the NRS.

17. An apparatus of a user equipment (UE) for wireless communication, comprising:
- means for receiving information identifying a first discontinuous reception (DRX) cycle parameter set and a second DRX cycle parameter set;
- means for identifying a set of paging occasions for the UE to monitor for paging, wherein the set of paging occasions is identified based at least on a comparison between at least a first DRX parameter value of the first DRX cycle parameter set and a second DRX parameter value of the second DRX cycle parameter set to identify a minimum of at least the first DRX parameter value and the second DRX parameter value, wherein the second DRX cycle parameter set comprises a cell-specific DRX cycle length of a cell of the UE;
- means for identifying a set of time instances for which a narrowband reference signal (NRS) is to be monitored irrespective of whether paging is present on the set of time instances, wherein the set of time instances is identified based at least on the second DRX cycle parameter set; and
- means for communicating based at least on the set of paging occasions and the set of time instances.

18. The apparatus of claim 17, wherein the first DRX cycle parameter set comprises a UE-specific DRX cycle length, and the second DRX cycle parameter set comprises a cell-specific DRX cycle parameter set.

19. The apparatus of claim 17, wherein the first DRX cycle parameter set comprises a UE-specific DRX cycle length, and the second DRX cycle parameter set comprises a plurality of UE-specific DRX cycle lengths.

20. The apparatus of claim 19, wherein the plurality of UE-specific DRX cycle lengths include all UE-specific DRX cycle lengths configurable for the apparatus.

21. The apparatus of claim 19, wherein the plurality of UE-specific DRX cycle lengths include all UE-specific DRX cycle lengths shorter than or equal to the cell-specific DRX cycle length.

22. The apparatus of claim 19, wherein the plurality of UE-specific DRX cycle lengths are configured for the apparatus.

23. The apparatus of claim 17, further comprising:
- means for receiving an indication of whether the second DRX cycle parameter set includes a plurality of DRX cycle configurations or a single DRX cycle configuration.

24. The apparatus of claim 17, wherein the first DRX cycle parameter set corresponds to a UE-specific DRX cycle length, and wherein the second DRX cycle parameter set corresponds to a DRX cycle length for identification of the set of time instances associated with the NRS.

25. An apparatus of a network entity for wireless communication, comprising:
- means for transmitting information identifying a first discontinuous reception (DRX) cycle parameter set and a second DRX cycle parameter set;
- means for identifying a set of paging occasions associated with a user equipment (UE), wherein the set of paging occasions is identified based at least on a comparison between at least a first DRX parameter value of the first DRX cycle parameter set and a second DRX parameter value of the second DRX cycle parameter set to identify a minimum of at least the first DRX parameter value and the second DRX parameter value, wherein the second DRX cycle parameter set comprises a cell-specific DRX cycle length of the network entity;
- means for identifying a set of time instances for which a narrowband reference signal (NRS) is to be transmitted irrespective of whether paging is transmitted on the set of time instances, wherein the set of time instances is identified based at least on the second DRX cycle parameter set; and
- means for communicating based at least on the set of paging occasions and the set of time instances.

26. The apparatus of claim 25, wherein the first DRX cycle parameter set comprises a UE-specific DRX cycle length of the UE, and the second DRX cycle parameter set comprises a cell-specific DRX cycle parameter set.

27. The apparatus of claim 25, wherein the first DRX cycle parameter set comprises a UE-specific DRX cycle length, and the second DRX cycle parameter set comprises a plurality of UE-specific DRX cycle lengths.

28. The apparatus of claim 27, wherein the plurality of UE-specific DRX cycle lengths include all UE-specific DRX cycle lengths configurable for the UE.

29. The apparatus of claim 27, wherein the plurality of UE-specific DRX cycle lengths include all UE-specific DRX cycle lengths shorter than or equal to the cell-specific DRX cycle length.

30. The apparatus of claim 27, further comprising:
means for configuring the plurality of UE-specific DRX cycle lengths for the UE.

31. The apparatus of claim 25, further comprising:
means for transmitting an indication of whether the second DRX cycle parameter set includes a plurality of DRX cycle configurations or a single DRX cycle configuration.

32. The apparatus of claim 25, wherein the first DRX cycle parameter set corresponds to a UE-specific DRX cycle length, and wherein the second DRX cycle parameter set corresponds to a DRX cycle length for identification of the set of time instances associated with the NRS.

33. A user equipment (UE) for wireless communication, comprising:
a memory; and
one or more processors coupled to the memory, the memory storing instructions capable of configuring the one or more processors to cause the UE to:
receive information identifying a first discontinuous reception (DRX) cycle parameter set and a second DRX cycle parameter set;
identify a set of paging occasions for the UE to monitor for paging, wherein the set of paging occasions is identified based at least on a comparison between at least a first DRX parameter value of the first DRX cycle parameter set and a second DRX parameter value of the second DRX cycle parameter set to identify a minimum of at least the first DRX parameter value and the second DRX parameter value, wherein the second DRX cycle parameter set comprises a cell-specific DRX cycle length of a cell of the UE;
identify a set of time instances for which a narrowband reference signal (NRS) is to be monitored irrespective of whether paging is present on the set of time instances, wherein the set of time instances is identified based at least on the second DRX cycle parameter set; and
communicate based at least on the set of paging occasions and the set of time instances.

34. The UE of claim 33, wherein the first DRX cycle parameter set comprises a UE-specific DRX cycle length, and the second DRX cycle parameter set comprises a cell-specific DRX cycle parameter set.

35. The UE of claim 33, wherein the first DRX cycle parameter set comprises a UE-specific DRX cycle length, and the second DRX cycle parameter set comprises a plurality of UE-specific DRX cycle lengths.

36. The UE of claim 35, wherein the plurality of UE-specific DRX cycle lengths include all UE-specific DRX cycle lengths configurable for the UE.

37. The UE of claim 35, wherein the plurality of UE-specific DRX cycle lengths include all UE-specific DRX cycle lengths shorter than or equal to a cell-specific DRX cycle parameter set.

38. The UE of claim 35, wherein the plurality of UE-specific DRX cycle lengths are configured for the UE.

39. The UE of claim 33, wherein the instructions are further capable of configuring the one or more processors to cause the UE to:
receive an indication of whether the second DRX cycle parameter set includes a plurality of DRX cycle configurations or a single DRX cycle configuration.

40. The UE of claim 33, wherein the first DRX cycle parameter set corresponds to a UE-specific DRX cycle length, and wherein the second DRX cycle parameter set corresponds to a DRX cycle length for identification of the set of time instances associated with the NRS.

41. A network entity for wireless communication, comprising:
a memory; and
one or more processors coupled to the memory, the memory storing instructions capable of configuring the one or more processors to cause the network entity to:
transmit information identifying a first discontinuous reception (DRX) cycle parameter set and a second DRX cycle parameter set;
identify a set of paging occasions associated with a user equipment (UE), wherein the set of paging occasions is identified based at least on a comparison between at least a first parameter value of the first DRX cycle parameter set and a second DRX parameter value of the second DRX cycle parameter set to identify a minimum of at least the first DRX parameter value and the second DRX parameter value, wherein the second DRX cycle parameter set comprises a cell-specific DRX cycle length of the network entity;
identify a set of time instances for which a narrowband reference signal (NRS) is to be transmitted irrespective of whether paging is transmitted on the set of time instances, wherein the set of time instances is identified based at least on the second DRX cycle parameter set; and
communicate based at least on the set of paging occasions and the set of time instances.

42. The network entity of claim 41, wherein the first DRX cycle parameter set comprises a UE-specific DRX cycle length of the UE, and the second DRX cycle parameter set comprises a cell-specific DRX cycle parameter set.

43. The network entity of claim 41, wherein the first DRX cycle parameter set comprises a UE-specific DRX cycle length, and the second DRX cycle parameter set comprises a plurality of UE-specific DRX cycle lengths.

44. The network entity of claim 43, wherein the plurality of UE-specific DRX cycle lengths include all UE-specific DRX cycle lengths configurable for the UE.

45. The network entity of claim 43, wherein the plurality of UE-specific DRX cycle lengths include all UE-specific DRX cycle lengths shorter than or equal to the cell-specific DRX cycle length.

46. The network entity of claim 43, wherein the instructions are further capable of configuring the one or more processors to cause the network entity to:
configure the plurality of UE-specific DRX cycle lengths for the UE.

47. The network entity of claim 41, wherein the instructions are further capable of configuring the one or more processors to cause the network entity to:
transmit an indication of whether the second DRX cycle parameter set includes a plurality of DRX cycle configurations or a single DRX cycle configuration.

48. The network entity of claim 41, wherein the first DRX cycle parameter set corresponds to a UE-specific DRX cycle length, and wherein the second DRX cycle parameter set corresponds to a DRX cycle length for identification of the set of time instances associated with the NRS.

49. A non-transitory computer-readable medium storing one or more instructions for wireless communication, the one or more instructions capable of configuring one or more processors to cause a user equipment (UE) to:
receive information identifying a first discontinuous reception (DRX) cycle parameter set and a second DRX cycle parameter set;
identify a set of paging occasions for the UE to monitor for paging, wherein the set of time instances is identified based at least on a comparison between at least a first DRX parameter value of the first DRX cycle parameter set and a second DRX parameter value of the second DRX cycle parameter set to identify a minimum of at least the first DRX parameter value and the second DRX parameter value, wherein the second DRX cycle parameter set comprises a cell-specific DRX cycle length;
identify a set of time instances for which a narrowband reference signal (NRS) is to be monitored irrespective of whether paging is present on the set of time instances, wherein the set of time instances is identified based at least on the second DRX cycle parameter set; and
communicate based at least on the set of paging occasions and the set of time instances.

50. The non-transitory computer-readable medium of claim 49, wherein the first DRX cycle parameter set comprises a UE-specific DRX cycle length, and the second DRX cycle parameter set comprises a cell-specific DRX cycle parameter set.

51. The non-transitory computer-readable medium of claim 49, wherein the first DRX cycle parameter set comprises a UE-specific DRX cycle length, and the second DRX cycle parameter set comprises a plurality of UE-specific DRX cycle lengths.

52. The non-transitory computer-readable medium of claim 51, wherein the plurality of UE-specific DRX cycle lengths include all UE-specific DRX cycle lengths configurable for the UE.

53. A non-transitory computer-readable medium storing one or more instructions for wireless communication, the one or more instructions capable of configuring one or more processors to cause a network entity to:
transmit information identifying a first discontinuous reception (DRX) cycle parameter set and a second DRX cycle parameter set;
identify a set of paging occasions associated with a user equipment (UE), wherein the set of paging occasions is identified based at least on a comparison between at least a first DRX parameter value of the first DRX cycle parameter set and a second DRX parameter value of the second DRX cycle parameter set to identify a minimum of at least the first DRX parameter value and the second DRX parameter value, wherein the second DRX cycle parameter set comprises a cell-specific DRX cycle length;
identify a set of time instances for which a narrowband reference signal (NRS) is to be transmitted irrespective of whether paging is transmitted on the set of time instances, wherein the set of time instances is identified based at least on the second DRX cycle parameter set; and
communicate based at least on the set of paging occasions and the set of time instances.

54. The non-transitory computer-readable medium of claim 53, wherein the first DRX cycle parameter set comprises a UE-specific DRX cycle length of the UE, and the second DRX cycle parameter set comprises a cell-specific DRX cycle parameter set.

55. The non-transitory computer-readable medium of claim 53, wherein the first DRX cycle parameter set comprises a UE-specific DRX cycle length, and the second DRX cycle parameter set comprises a plurality of UE-specific DRX cycle lengths.

56. The non-transitory computer-readable medium of claim 55, wherein the plurality of UE-specific DRX cycle lengths include all UE-specific DRX cycle lengths configurable for the UE.

* * * * *